US012800071B2

(12) United States Patent
Ismert

(10) Patent No.: US 12,800,071 B2
(45) Date of Patent: Nov. 17, 2026

(54) FLEXIBLE GAS LINE RISER

(71) Applicant: Pro-Flex, LLC, Hillsboro, IN (US)

(72) Inventor: Joseph N. Ismert, Stilwell, KS (US)

(73) Assignee: Pro-Flex, LLC, Hillsboro, IN (US)

( * ) Notice: Subject to any disclaimer, the term of this patent is extended or adjusted under 35 U.S.C. 154(b) by 77 days.

(21) Appl. No.: 18/950,021

(22) Filed: Nov. 16, 2024

(65) Prior Publication Data

US 2025/0164045 A1 May 22, 2025

Related U.S. Application Data

(60) Provisional application No. 63/600,466, filed on Nov. 17, 2023.

(51) Int. Cl.

*F17D 1/04* (2006.01)
*F16L 19/02* (2006.01)

(52) U.S. Cl.

CPC ....... *F16L 19/0206* (2013.01); *F16L 19/0218* (2013.01); *F17D 1/04* (2013.01)

(58) Field of Classification Search

CPC ..... F16L 19/061; F16L 19/0206; F16L 19/07; F16L 19/0218; F16L 2201/20; F17D 1/04; E21B 17/02; E21B 17/021; E21B 17/085; E21B 17/08; E21B 17/0853

See application file for complete search history.

(56) References Cited

U.S. PATENT DOCUMENTS

| | | | | |
|---|---|---|---|---|
| 8,083,266 B2 | 12/2011 | Tarquini et al. | | |
| 11,796,101 B2 | 10/2023 | Watson et al. | | |
| 2006/0284416 A1* | 12/2006 | Tarquini | F16L 19/0212 | 285/272 |

FOREIGN PATENT DOCUMENTS

| | | | | |
|---|---|---|---|---|
| CA | 2493695 A1 * | 11/2005 | | |
| DE | 9315600 U1 * | 4/1994 | | |
| EP | 0565820 A1 * | 10/1993 | | F16L 47/04 |
| EP | 1236947 A1 * | 9/2002 | | F16L 33/224 |

* cited by examiner

*Primary Examiner* — Matthew Troutman
*Assistant Examiner* — James A Linford
(74) *Attorney, Agent, or Firm* — AVEK IP, LLC; Kent R. Erickson

(57) ABSTRACT

An apparatus for connecting an underground gas line to an above-ground connection includes a threaded adapter at a first end, a nut, a gas line support insert, a sealing element, a collet gripper, a hose ferrule, a casing conduit, and a moisture seal located at a second end. The nut is configured to threadingly engage with the threaded adapter to form an internal cavity between the adapter, the nut, and the gas line. The flexible sealing element and the collet gripper are disposed in the internal cavity, with the gripper abutting the flexible sealing element. The gas line support insert is disposed within the gas line and secured by the threaded adapter. The flexible casing conduit extends around a periphery of the gas line and is secured by the hose ferrule to the nut secured to the gas line by the moisture seal.

19 Claims, 9 Drawing Sheets

FLEXIBLE GAS LINE RISER

CROSS REFERENCE TO RELATED APPLICATIONS

This application claims the benefit of U.S. Provisional Patent Application Ser. No. 63/600,466, entitled Flexible Gas Line Riser, filed Nov. 17, 2023, the disclosure of which is incorporated herein in its entirety by reference.

BACKGROUND OF THE INVENTION

Field of the Invention

The present invention relates generally to the field of gas line fittings. More specifically, the present invention relates to gas risers for connecting underground gas lines to above-ground connections.

Background of the Invention

Many gases used for basic utilities are highly flammable and are routed underground using gas lines extending between a gas source and the building or location requiring the gas. In many cases, the gas source may be in the form of a gas main or an intermediate gas storage tank. The gas lines are typically routed underground for safety purposes, to reduce the risk of a gas line being ruptured unexpectedly. These underground gas lines are typically formed from a composite or thermoplastic in order to avoid corrosion. However, the connections between the gas line and the building or meter are typically situated above ground, thereby requiring the gas line to transition from underground to above ground. This transitional portion of the gas line is required to be protected by a cover or sheath known as a gas riser.

Gas risers extend generally from the meter or building connection down the length of the gas line for a known length which covers at least the transitional portion of the gas line, including underground. The above-ground portion of the gas riser is generally configured to couple to the meter, building, or other device with a standard fitting, such as a threaded fitting, and is coupled to the gas line by a compression fitting. Typically, the below-ground end of the gas riser will terminate at an environmental or moisture seal which prevents moisture or other particles from entering the gas riser between the riser and the gas line.

SUMMARY OF THE INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to an embodiment, a gas riser apparatus for connecting an underground gas line to an above-ground connection includes a threaded adapter having a first threaded end and a second threaded end. The gas riser includes a nut configured to threadingly engage with the second threaded end of the adapter to form an internal cavity between the adapter, the nut, and the gas line. The gas riser also includes a flexible sealing element disposed in the internal cavity proximate the threaded adapter and a collet gripper disposed in the internal cavity and abutting the flexible sealing element, with the collet gripper being configured to be compressed against and frictionally engage with the gas line upon threaded advancement of the nut along the second threaded end toward the first threaded end of the threaded adapter. The gas riser also includes a tubular gas line support insert disposed within the gas line and secured within the threaded adapter, the gas line support extending through the second threaded end of the threaded adapter, forming an annular gap between an outer surface of the tubular gas line support insert and the inner surface of the second threaded end of the threaded adapter. The annular gap is sized for insertion of an end of the gas line therein with the gas line extending around the tubular gas line support insert.

According to another embodiment, an apparatus for connecting a gas line to threaded connector includes a threaded adapter disposed at a first end of the apparatus, the adapter having a first threaded end configured to engage with an external device and a second threaded end. The apparatus includes a nut configured to threadingly engage with the second threaded end of the threaded adapter to form an internal cavity between the threaded adapter, the nut, and the gas line. The nut has an internally sloped shoulder forming an outer end of the internal cavity. The apparatus further includes a flexible seal disposed in the internal cavity adjacent the adapter and a collet gripper disposed in the internal cavity and abutting the flexible sealing element. The collet gripper has an annular base and a plurality of fingers extending longitudinally from the annular base which abuts the flexible seal. The plurality of fingers extend away from the threaded adapter, each of the fingers of the collet gripper has a sloped face on an end opposite the threaded adapter and extending substantially parallel to and in abutting relationship with the internally sloped shoulder on the nut. The apparatus also includes a tubular gas line support insert secured within the threaded adapter and extending through the second threaded end of the threaded adapter, forming an annular gap between an outer surface of the tubular gas line support insert and an inner surface of the second threaded end of the threaded adapter. The annular gap is sized for insertion of an end of the gas line therein with the gas line extending around the tubular gas line support insert. Within the apparatus, threaded advancement of the nut on the second threaded end of the threaded adapter toward the first threaded end thereon advances the internally sloped shoulder of the nut longitudinally against the sloped face of each of the plurality of fingers of the collet gripper. This drives the plurality of fingers radially inward against the gas line and drives the collet gripper longitudinally along the gas line and toward the flexible seal, compressing the flexible seal between annular base of the collet gripper and the threaded adapter such that the flexible seal expands radially inward to frictional engage the gas line.

According to yet another embodiment, a gas riser apparatus for connecting a gas line to a connection has a first end and a second end. The gas riser apparatus includes a threaded adapter disposed at the first end of the apparatus, the adapter having a first threaded end and a second threaded end. The gas riser apparatus further includes a nut configured to threadingly engage with the second threaded end of the threaded adapter to form an internal cavity between the threaded adapter, the nut, and the gas line. The nut has an internally sloped shoulder forming a portion of the internal cavity. The gas riser apparatus also includes a flexible sealing element disposed in the internal cavity proximate the adapter, and a collet gripper disposed in the internal cavity which abuts the flexible sealing element and the sloped shoulder. The collet gripper has a base end which abuts the flexible sealing element, and a sloped face of a distal end of the collet gripper abuts the sloped shoulder of the nut. The gas riser apparatus includes a tubular gas line support insert connected to and disposed within the threaded adapter, extending through the second threaded end thereof forming an annular gap between an outer surface of the tubular gas line support insert and an inner surface of the second threaded end of the threaded adapter. The annular gap is sized for insertion of an end of the gas line therein with the gas line extending around the tubular gas line support insert. The apparatus includes a flexible casing conduit extending around a periphery of the gas line, and a hose ferrule secured to an exterior circumference of the nut and extending around a portion of the casing conduit, and a moisture seal disposed proximate the second end of the apparatus, with the moisture seal extending around the gas line and the flexible casing conduit. The apparatus is configured such that threaded advancement of the nut on the second threaded end of the threaded adapter toward the first threaded end thereon advances the internally sloped shoulder of the nut longitudinally against the sloped face of each of the plurality of fingers of the collet gripper. This drives the plurality of fingers radially inward against the gas line and drives the collet gripper longitudinally along the gas line and toward the flexible seal, compressing the flexible seal between annular base of the collet gripper and the threaded adapter such that the flexible seal expands radially inward to frictional engage the gas line.

BRIEF DESCRIPTION OF THE DRAWINGS

Illustrative embodiments of the present disclosure are described in detail below with reference to the attached drawing figures.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Figure 1:
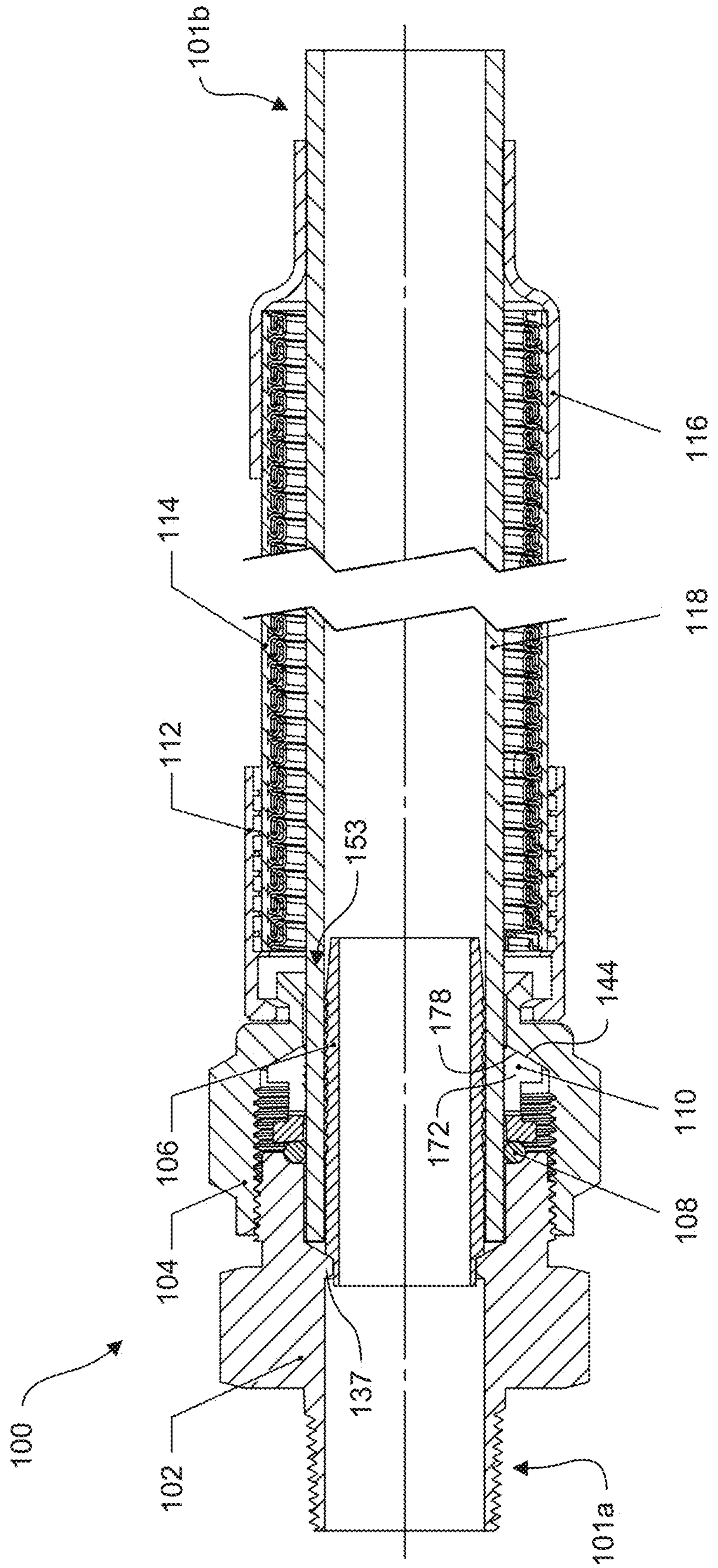
FIG. 1 is a section view of a gas riser assembly according to an embodiment of the invention.

FIG. 1 shows an embodiment of a flexible gas riser apparatus 100 for connecting an underground gas line to an above-ground connection. The gas riser 100 is generally annular in shape and includes a threaded adapter 102 at a first end 101*a*, and also includes a nut 104, a gas line support insert 106, a flexible sealing element or O-ring 108, a collet gripper 110, a hose ferrule 112, a casing conduit 114, and a moisture seal 116 located at a second end 101*b*. Each element 102-116 of the gas riser 100 extends around a gas line 118 of a known type and is configured to allow gas to pass through the riser 100 from a gas source to the connection at the first end 101*a*. For illustrative purposes, the gas riser 100 is shown in a shortened form with the first end 101*a* and the second end 101*b* appearing substantially coaxial. However, in practice the gas riser 100 may have a length of at least 36 inches, and may be substantially L-shaped or bent at a substantially right angle such that a centerline extending through the first end 101*a* and a centerline extending through the second end 101*b* are substantially perpendicular, with the first end 101*a* being located above ground while the second end 101*b* is located below ground.

Figure 2:
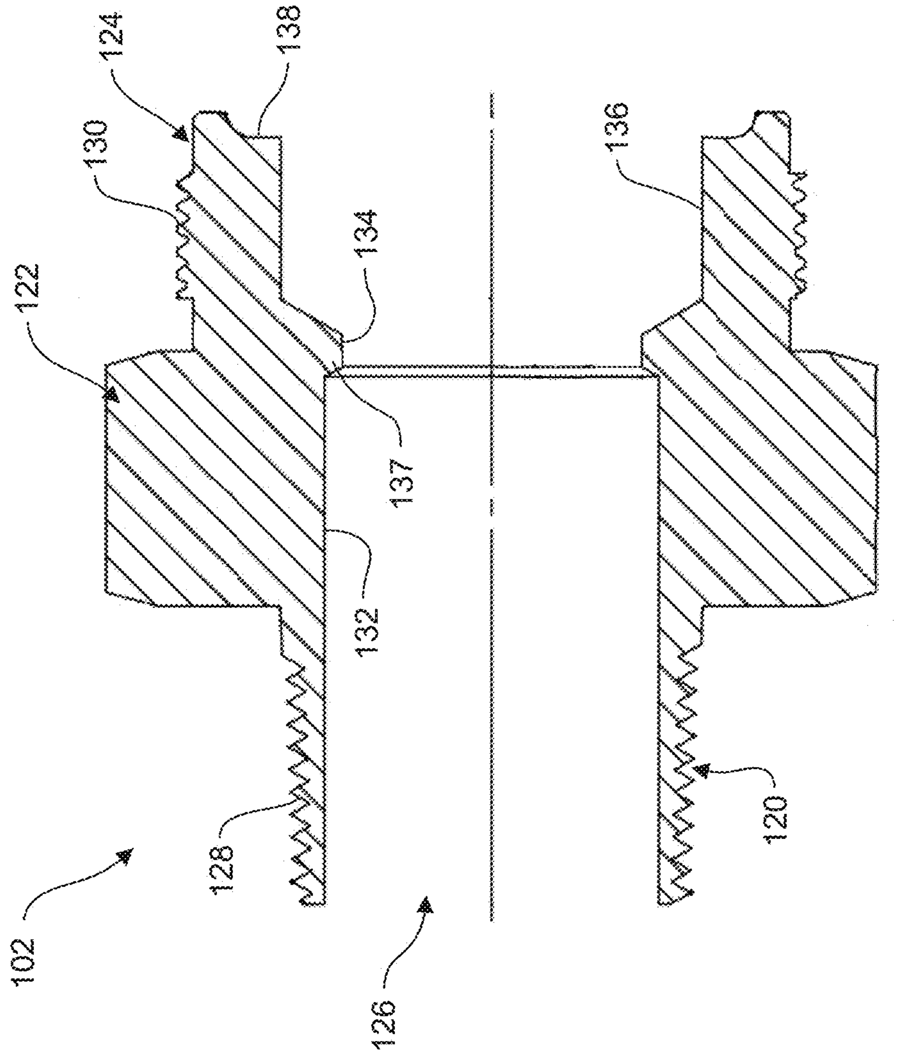
FIG. 2 is a section view of a threaded adapter forming part of the gas riser assembly of FIG. 1.

Referring now to FIG. 2, the threaded adapter 102 generally includes a first threaded portion 120, a central flange 122, and a second threaded portion 124. The threaded adapter 102 includes a central bore 126 extending longitudinally therethrough, in which the gas line support insert 106 and/or the gas line 118 may be at least partially inserted. The first threaded portion 120 includes external thread 128 configured to threadingly mate with a complimentary threaded connection, for example one found on a building, appliance, or gas meter. In some embodiments, such as the illustrated embodiment, the external thread 128 may be tapered, while in other embodiments the thread 128 may be a straight thread. The central flange 122 may be substantially hexagonal, such that the adapter 102 may be turned using a wrench by a user during installation or removal of the gas riser 100. The second threaded portion 124 includes an external thread 130 configured to threadingly mate with the gas riser nut 104. The external thread 130 may be substantially identical to the external thread 128, although in some embodiments the threads 128 and 130 may be dissimilar in type and/or size.

Internally, the central bore 126 may be characterized by a first end section 132, a middle section 134, and a second end section 136. The first end section 132, of a known diameter, may extend generally for the length of the first threaded section 120 and the central flange 122. The middle section 134 comprises a reduced diameter portion of the central bore 126 formed by an annular rib 137 projecting inward from the inner surface of the threaded adapter 102 surrounding the central bore 126. The annular rib 137 is disposed between the first and second end sections 132 and 136, and extends inward from an interior surface of the bore 126, such that the gas line support insert 106 may engage the annular rib 137 either via a complimentary engaging structure 140 located on the gas line support insert 106 or via a simple compression fit. The second end section 136 extends generally along the length of the second threaded section 124, and has a diameter which is greater than the diameter of the first end section 132 of the bore 126. An internal diameter of the second end section 132 of the bore 126 is generally sized to receive an end of the gas line 118 therein.

The threaded adapter 102 may also include a notch or arcuate recess 138 formed on a distal end of the second threaded portion 124. The recess 138 is configured to at least partially hold the O-ring 108 therein. In the illustrated embodiment, the recess 138 is located on an end of the second threaded section 124 of the threaded adapter 102.

Figure 3:
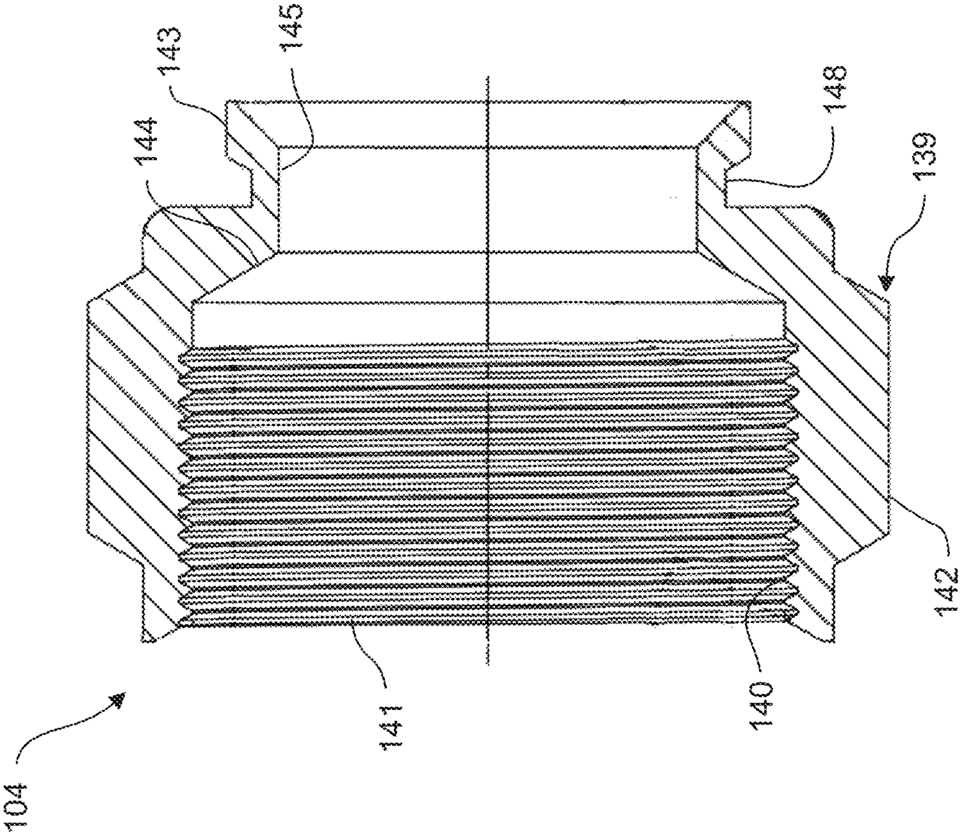
FIG. 3 is a section view of a nut forming part of the gas riser assembly of FIG. 1.

Turning now to FIG. 3, the nut 104 is configured to threadingly mate with the threaded adapter 102, and includes a nut section 139 having an internal cavity sized such that the O-ring 108 and the collet gripper 110 may be enclosed therein when the gas riser 100 is fully assembled. The nut 104 includes internal thread 141 which are complimentary to and mate with the thread 130 located on the threaded adapter 102. As illustrated in FIG. 1, the nut 104 may be sized such that only a portion of the thread 141 is necessary to secure the adapter 102 to the nut 104. The nut 104 includes an exterior surface 142 which may be generally hexagonal in shape, such that the nut 104 may be tightened using a wrench or other appropriate tool. The nut 104 includes a hollow or annular neck portion 143 formed at one end of the nut 104 with an internal bore 145 formed in the neck portion 143. A sloped shoulder or face 144 is formed internally within the nut 104 between the internal cavity of the nut 104 and the internal bore 145 of the neck portion 143. The sloped shoulder 144 is configured to compress the collet gripper 110 when shoulder 144 is advanced toward the collet gripper 110 upon threadingly advancing the nut 104 toward the threaded adapter. The internal diameter of the bore 145 of the neck portion 143 of the nut 104 is similar in diameter to the outer diameter of the gas line 118. A groove, recess or notch 148 is formed in the exterior surface 142 of the neck portion 143 of the nut 104. The groove 148 is configured to receive a portion of the hose ferrule 112 therein to connect the hose ferrule 112 to the nut 104.

Figure 4:
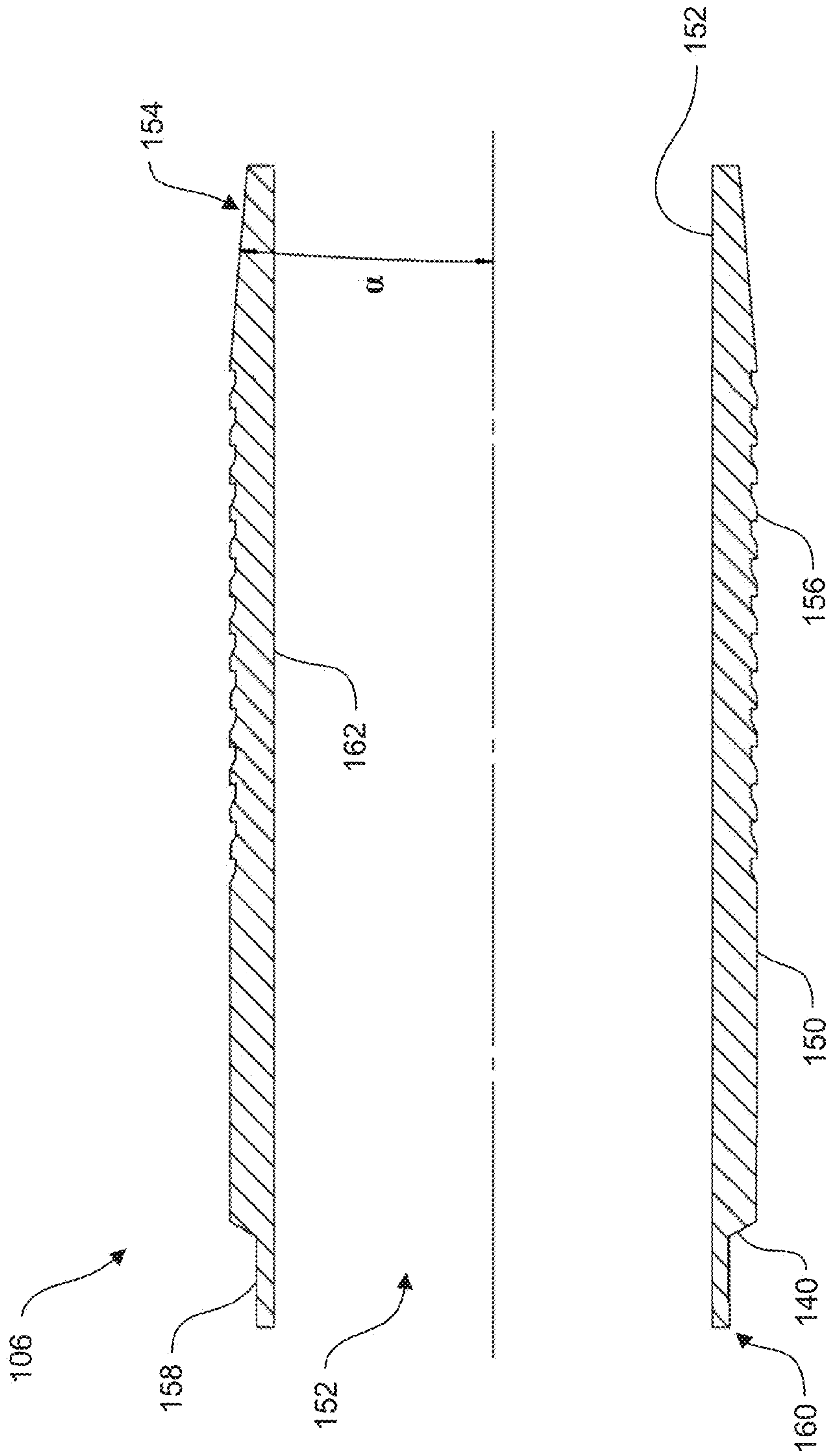
FIG. 4 is a section view of an annular gas line support insert forming part of the gas riser assembly of FIG. 1.

Referring now to FIG. 4, the gas line support insert 106 is generally annular in shape, having an outer surface 150 and an internal bore 152 extending longitudinally therethrough. The gas line support insert 106 is tubular and generally comprises a pipe nipple extending from the annular rib 137 longitudinally outward through the second threaded portion 124 of the threaded adapter 102 through the collet gripper 110 and through and past the distal end of the nut 104. The gas line support insert 106 is sized such that the outermost surface 150 frictionally engages an interior surface of the gas line 118 when inserted into a generally annular space or gap 153 formed between the outer surface 150 of the gas line support insert 106 and the inner surface of the threaded adapter 102, the collet gripper 110 and the nut 104 as shown in FIG. 1. The gas line support insert 106 may be tapered toward a first end 154 at an angle $\alpha$, and may include a plurality of annular barbs or ridges 156 distributed along the outer surface 150 thereof. In the illustrated embodiment, the taper angle $\alpha$ is approximately five degrees, although one of skill in the art will appreciate that in other embodiments the taper angle $\alpha$ may be greater than or less than five degrees without departing from the scope of the invention. The gas line support insert 106 connects the gas line 118 to the adapter 102, and may include a notch or reduced diameter engaging structure 158 at a second end 160 which is sized to frictionally engage the internal annular rib 137 of the threaded adapter 102 and form a gas tight seal therebetween. The interior surface 162 of the gas line support insert 106 is substantially smooth.

Figure 5:
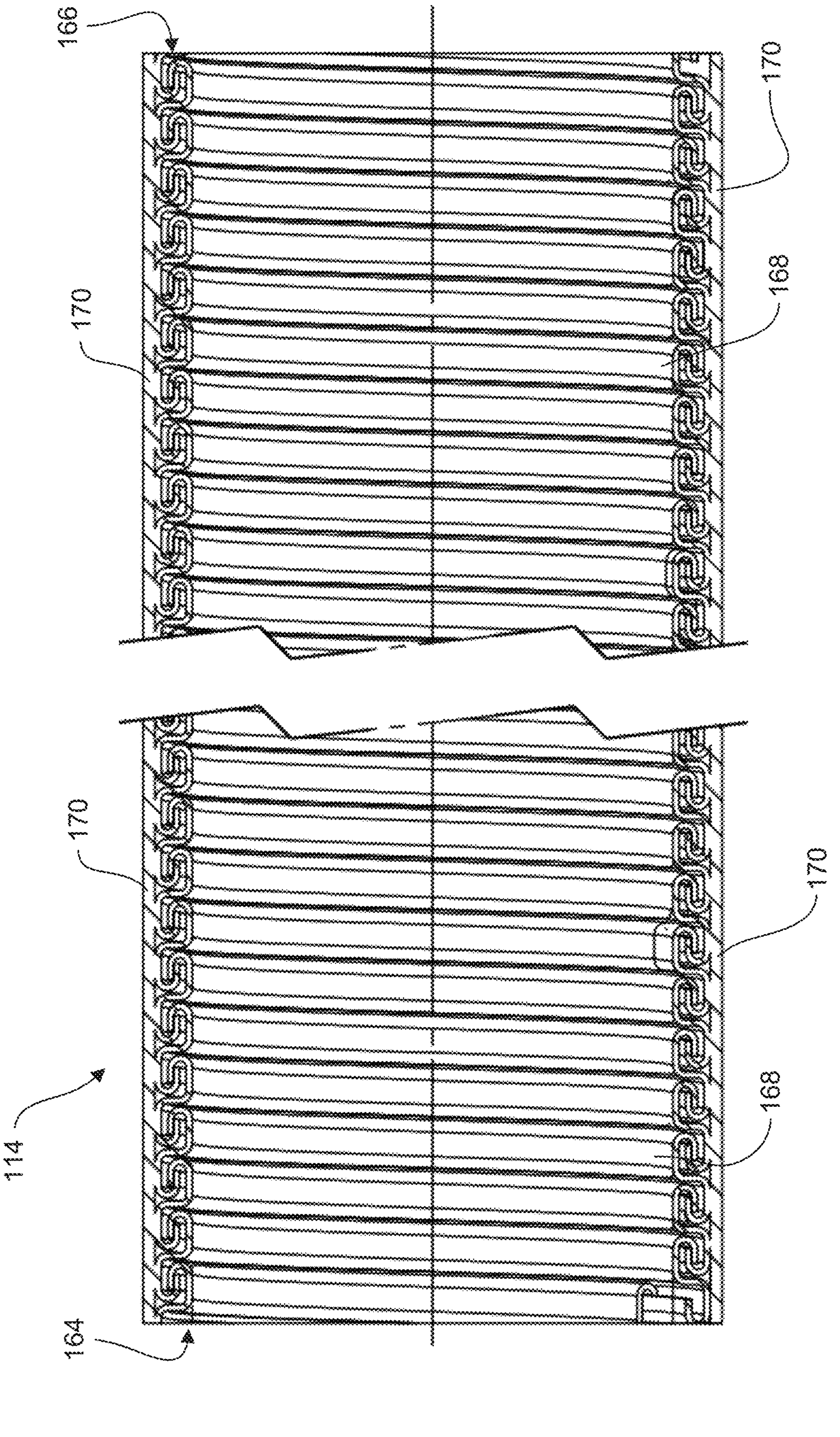
FIG. 5 is a section view of a casing forming part of the gas riser assembly of FIG. 1.

Turning now to FIG. 5, the casing 114 is a flexible conduit for protecting the gas line 118 from hazards both above and below ground. The casing 114 may be secured in place around a periphery of a portion of the gas line by the hose ferrule 112 (as shown in FIG. 1) at a first end 164, and may be held in place at a second end 166 by the environmental seal 116. The casing 114 generally includes a coiled steel inner portion 168 and a composite outer shell 170, which in the illustrated embodiment is formed from polyvinylchloride (PVC), although one of skill in the art will appreciate that there may be any number of suitable materials used for the outer shell 170 without departing from the scope of the invention. The composite shell 170 and the coiled inner portion 168 allow the casing 114 to bend in order to safely transition the gas line 118 from underground to above ground. In the illustrated embodiment, the casing 114 is sized to allow a minimum bend radius of approximately 22.25 inches, although one of skill in the art will appreciate that in other embodiments the casing 114 may allow for bends of different radii without departing from the scope of the invention.

Figure 6:
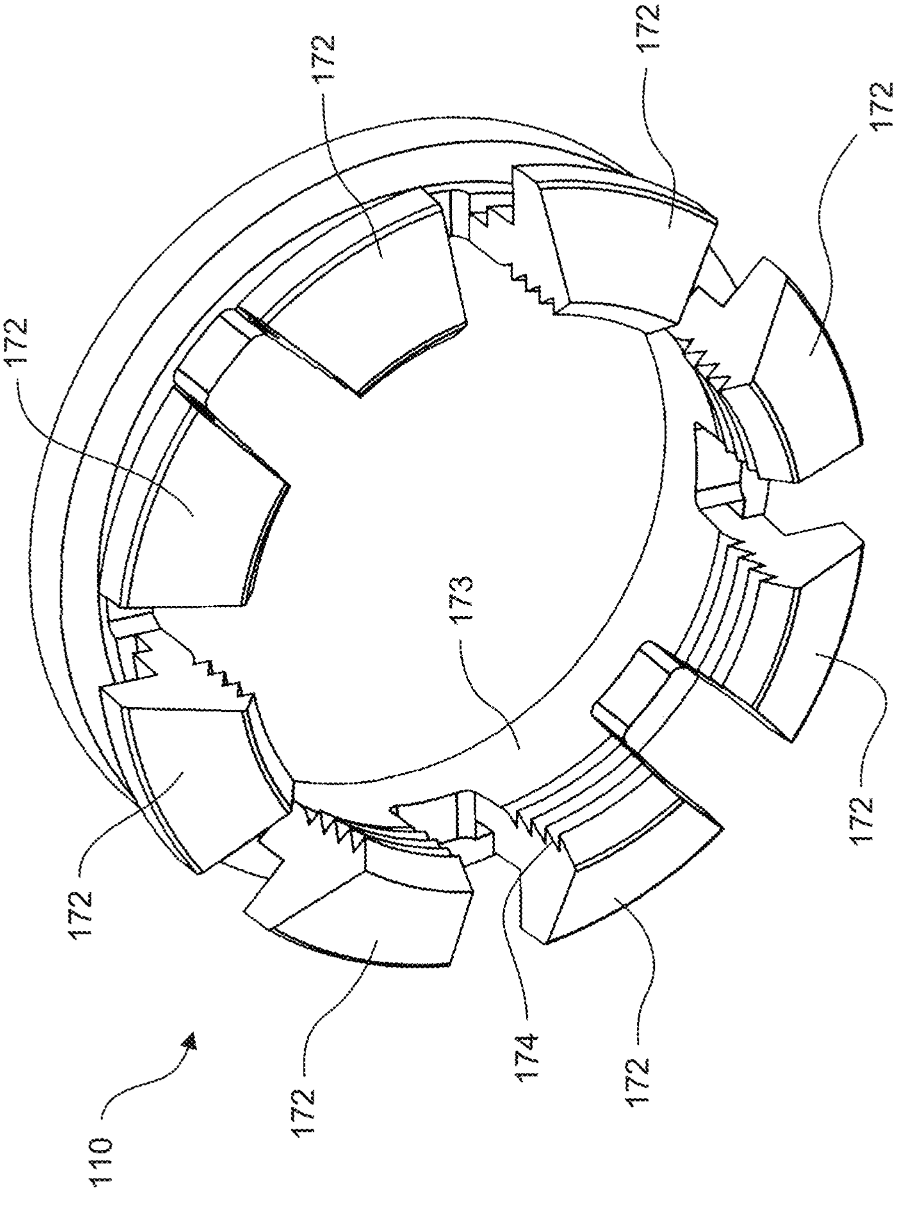
FIG. 6 is a front perspective view of a collet forming part of the gas riser assembly of FIG. 1.
Figure 7:
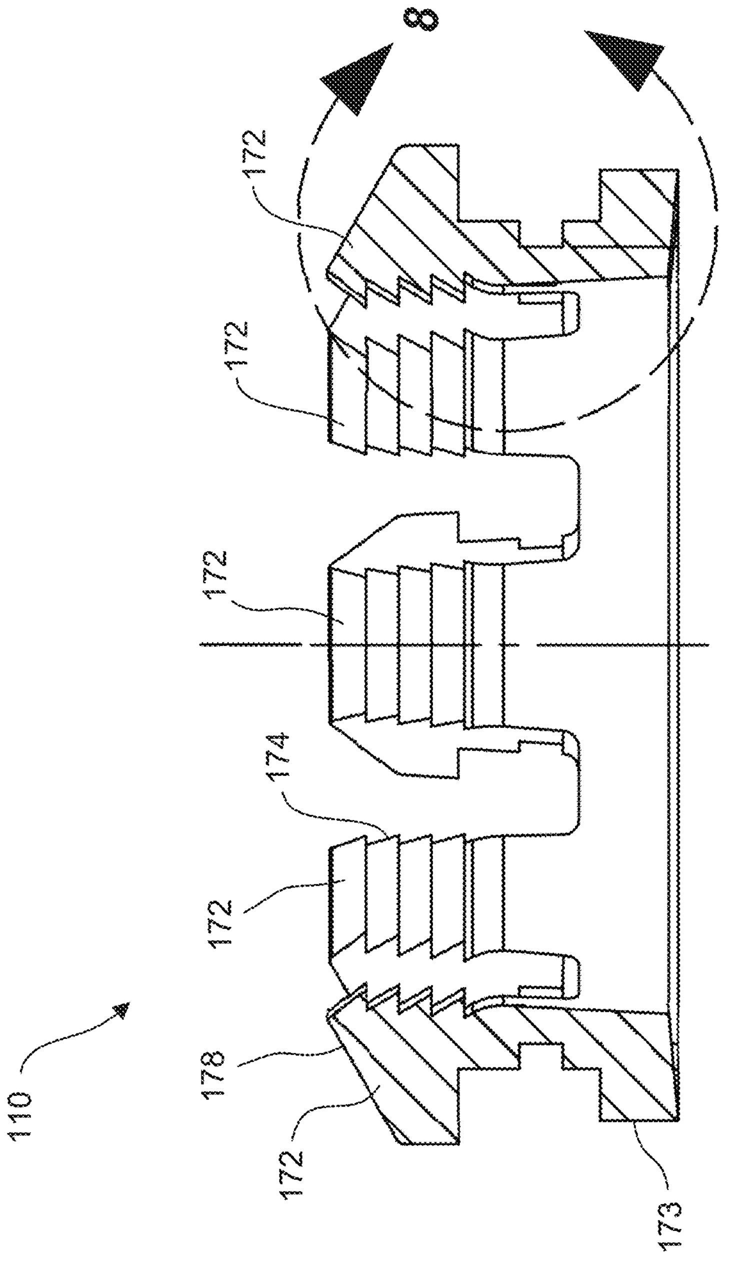
FIG. 7 is a section view of the collet of FIG. 6 forming part of the gas riser assembly of FIG. 1.
Figure 8:
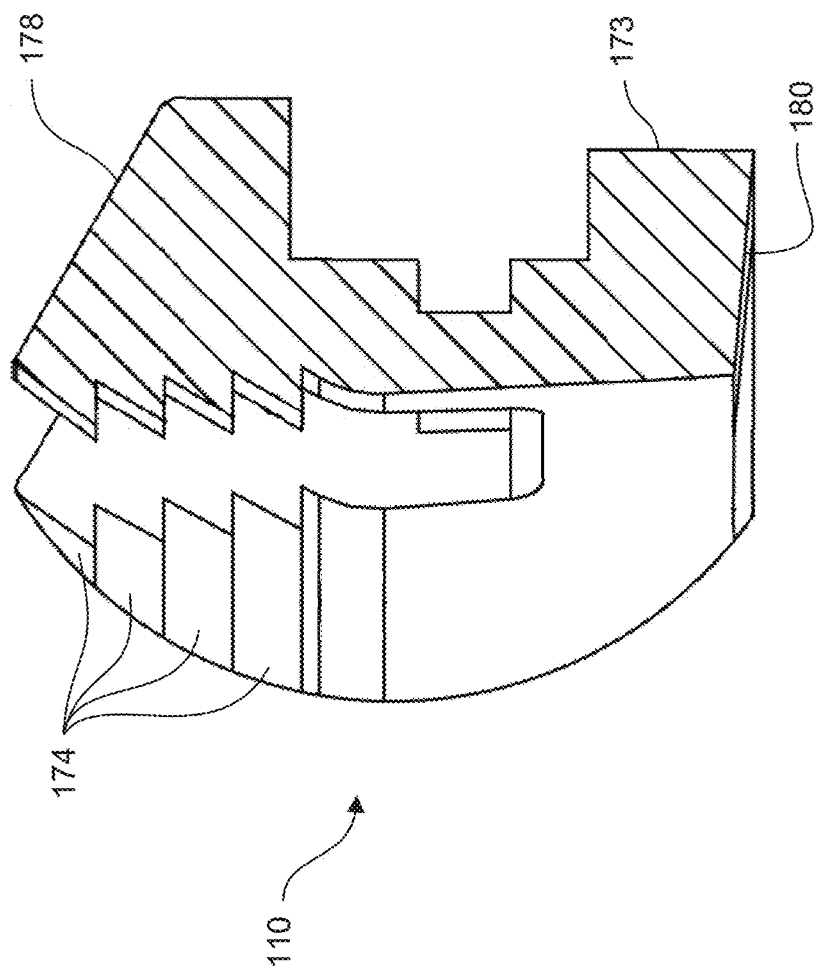
FIG. 8 is an enlarged partial section view of the collet of FIG. 6 forming part of the gas riser assembly of FIG. 1.

FIGS. 6-8 show an example of a collet gripper 110 used for securing the gas line 118 to the gas riser 100. The collet gripper 110 is generally circular and includes a plurality of fingers or teeth 172 projecting longitudinally and circumferentially from an annular base 173. Each finger has a plurality of ridges or barbs 174 formed on an inner surface thereof for selectively gripping an exterior surface of the gas line 118. When the gas riser 100 is assembled, the nut 104 applies pressure to the fingers 172 of the collet gripper 110, and the barbs 174 are forced into the exterior surface of the gas line 118. More specifically, the sloped shoulder 144 of the nut 104 abuts against an opposingly sloped face or surface 178 of an outer end of each finger 172 with the sloped shoulder 144 of the nut pressing inwardly on the sloped face 178 of each finger 172 as the nut 104 is threadingly drawn toward the threaded adapter 102. The sloped face 178 of an outer end of each finger 172 may also be described as extending in parallel or substantially parallel abutting relationship with the internally sloped shoulder 144 of the nut 104. Both he sloped face 178 of each finger 172 and the sloped shoulder 144 of the nut 104 may be described as sloping radially inwardly and longitudinally away from the O-ring 108 and the second threaded portion 124 against which the O-ring 108 abuts.

In the illustrated embodiment, the collet gripper 110 has 8 fingers 172, although in other embodiments not shown, the gripper 110 may have any number of fingers 172 which are radially distributed around a perimeter of the gripper 110. Unlike the threaded adapter 102, nut 104, and gas line support insert 106, which are all preferably fashioned from steel or another suitable metal, the collet gripper 110 is preferably formed from a composite material such as a thermoplastic. Specifically, the collet gripper 110 may be formed from polyoxymethylene (POM), although one of skill in the art will understand that the collet gripper 110 may be formed from any one of a number of suitable composite materials without departing from the scope of the invention.

As best seen in FIGS. 7 and 8, a portion of each finger 172 of the collet gripper 110 extending between the barb 174 and base end 180 is formed with reduced thickness to facilitate flexing of the fingers 172. The portion of reduced thickness may be formed as a plurality of rectangular notches or other suitable geometries. The collet gripper 110 may be formed such that a base end 180 (i.e., opposite the sloped face 178) of the gripper 110 is recessed or slightly angularly offset, as shown in FIG. 8, which may be desirable for restraining the flexible O-ring 108, which abuts the base end 180 of the collet gripper 110 when the gas riser is fully assembled. The combination of the collet gripper 110 and the O-ring 108 compressed between the adapter 102 and the nut 104 substantially restricts movement of the gas line 118 within the gas riser 100 and forms a gas tight seal around the exterior surface of the gas line 118. As the nut 104 is threaded onto the adapter 102, the sloped shoulder 144 engages the sloped face 178 of the fingers 172 of the collet gripper 110, compressing the fingers 172 and the barbs 174 on the fingers 172 inward against the outside of the gas line 118 thereby compressing the gas line 118 against the gas line support insert 106 and driving the base end 180 of the collet gripper 110 against the O-ring 108 and compressing the O-ring between base end 180 of the collet gripper 110 and the adapter 102.

Figure 9:
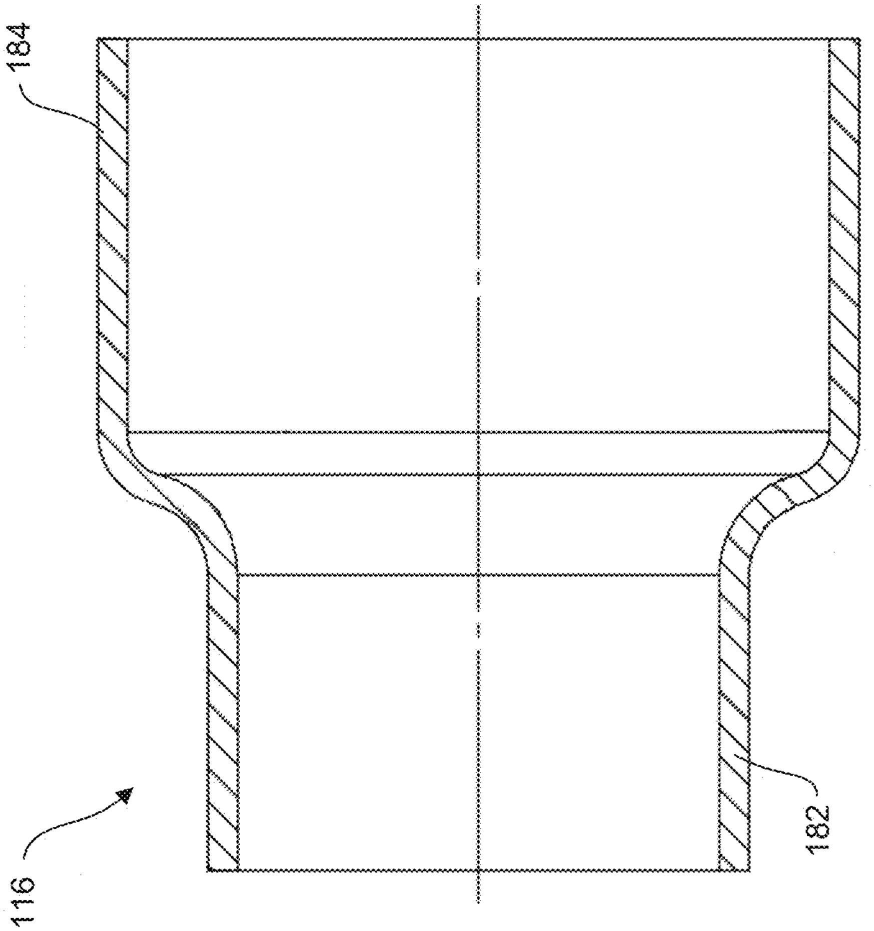
FIG. 9 is a section view of an environmental seal forming part of the gas riser assembly of FIG. 1.

Turning now to FIG. 9, the second (i.e., underground) end 101*b* of the gas riser 100 includes a moisture seal or environmental seal 116. The environmental seal 116 prevents water, dirt, or other environmental debris from entering the gas line 118 and/or the gas riser 100. The environmental seal 116 is preferably formed from a composite waterproof material, such as PVC, and extends around both the gas line 118 and the casing 114. The environmental seal 116 generally is comprised of two adjacent annuli of dissimilar radii, joined by a radiused S-bend, where the first annulus 182 is sized to extend around the gas line, and the second annulus 184 is sized to extend around the casing 114. In the illustrated embodiment, each curve of the S-bend has a radius of approximately 0.20 inches, although in other embodiments the size may differ to the embodiment shown.

To install the gas riser 100, the first threaded end 120 of the threaded adapter 102, with the gas line support insert 106 secured therein, is threaded into a threaded connector such as a threaded connector on a gas meter outlet, a regulator or gas piping system. The environmental seal 116, the casing 114, the ferrule 112, the nut 104, the collet gripper 110, and the O-ring 108 are then slid onto the free end of the gas line 118 which may be polymeric tubing. The components are slid onto the gas line 118 far enough away from the free end to provide a length the free end of the gas line 118 that can be inserted into the second threaded portion 124 of the threaded adapter 102. The free end of the gas line 118 is cut square, deburred and cleaned. A witness mark is drawn or otherwise made on the gas line 118 which generally corresponds to the length of the gas line 118 that will be inserted into the second threaded end or portion 124 of the threaded adapter 102. The casing 114 may be inserted into and secured to the ferrule 112 and the ferrule 112 connected to the neck portion 143 of the nut 104, with the ferrule 112 extending circumferentially around the neck portion 143 of the nut 104, before sliding the assembly onto the gas line 118.

The gas line 118 is inserted into the second threaded portion 124 of the threaded adapter 102 into the gap 153 between the gas line support insert 106 and the second threaded portion 124 of the threaded adapter 102 with the gas line support insert 106 extending into the free end of the gas line 118. The witness mark will extend into the second threaded portion 124 of the threaded adapter 102 within an acceptable tolerance when the gas line 118 is fully inserted therein. The O-ring 108 is then slid on the gas line 118 proximate to or against the second threaded portion 124 of the threaded adapter 102 and the collet gripper 110 is slid on the gas line 118 toward the O-ring 108 and preferably until the base end 180 of the collet gripper 110 abuts against the O-ring 108. The nut 104, with the ferrule 112 and casing 114 connected thereto, is then slid up to and threaded onto the second threaded portion 124 of the threaded adapter 102 capturing the 0-ring 108 and collet gripper 110 therebetween.

The nut 104 is then tightened or threadingly advanced on the second threaded portion 124 of the threaded adapter 102 until the external thread 130 thereon is not exposed. Tightening of the nut 104 on the second threaded portion 124, drawing the nut 104 toward the central flange 122 and first threaded end 120, draws the sloped shoulder 144 of the nut 104 against the sloped face 178 of each finger 172 of the collet gripper 110, pushing the collet gripper longitudinally toward the threaded adapter 102 and compressing the O-ring 108 between the base end 180 of the collet gripper 110 and the second threaded portion or end 124 of the threaded adapter 102 causing the O-ring 108 to expand radially inward to against the outer surface of the gas line 118 to form a seal therewith. Simultaneously, longitudinal movement of the sloped shoulder 144 against the sloped face 178 of the fingers 172 presses the fingers 172 radially inward such that barbs 174 engage and press into the outer surface of the gas line 118 to form a tight connection of the gas riser assembly 100 onto the gas line 118. The environmental seal 116 may then be slid over the gas line casing 114 and the second annulus 184 may be glued or secured over the casing 114 and the first annulus 182 may be glued or secured to the gas line 118.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

The invention claimed is:

1. A gas riser apparatus for connecting an underground gas line to an above-ground connection, comprising:

a threaded adapter having a first threaded end and a second threaded end;

a nut configured to threadingly engage the second threaded end of the threaded adapter to form an internal cavity between the threaded adapter, the nut, and the gas line;

a flexible sealing element disposed in the internal cavity proximate the threaded adapter;

a collet gripper disposed in the internal cavity and abutting the flexible sealing element; and a tubular gas line support insert secured within the threaded adapter and extending through the second threaded end thereof forming an annular gap between an outer surface of the tubular gas line support insert and an inner surface of the second threaded end of the threaded adapter, the annular gap sized for insertion of an end of the gas line therein with the gas line extending around the tubular gas line support insert;

wherein:

the collet gripper comprises an annular base abutting the flexible sealing element and a plurality of fingers extending longitudinally from the annular base, the collet gripper drivable longitudinally along the end of the gas line inserted in the annular gap upon threaded advancement of the nut along the second threaded end toward the first threaded end of the threaded adapter to compress the flexible seal between the annular base and the threaded adapter and to compress the plurality of fingers radially inward to frictionally engage the gas line inserted in the annular gap.

2. The gas riser apparatus of claim 1, further comprising:

a flexible casing conduit extending around a portion of the gas line; and a moisture seal extending over a portion of the gas line and a portion of the flexible casing conduit.

3. The gas riser apparatus of claim 2, further comprising a hose ferrule configured to secure an end of the flexible casing conduit to the nut.

4. The gas riser apparatus of claim 1, wherein the collet gripper comprises the plurality of fingers projecting longitudinally from the annular base, each finger having at least one barb formed on an inner surface thereof configured to be pressed against the gas line upon threaded advancement of the nut along the second threaded end toward the first threaded end of the threaded adapter.

5. The gas riser apparatus of claim 4, wherein the nut includes a sloped shoulder which forms an end of the internal cavity and which abuts an opposingly sloped surface on an end of each finger of the collet gripper such that when the nut is threadingly advanced toward the first threaded end of the threaded adapter, the sloped shoulder of the nut drives the opposingly sloped shoulder of each finger inward pressing each finger and the at least one barb formed thereon inward against the gas line.

6. The gas riser apparatus of claim 1, wherein the threaded adapter includes a notch configured to hold a portion of the flexible sealing element therein.

7. The gas riser apparatus of claim 1, wherein the collet gripper is formed from a composite material.

8. The gas riser apparatus of claim 1, wherein the flexible sealing element is an O-ring and the collet gripper includes a recess configured to restrain the O-ring against the threaded adapter.

9. An apparatus for connecting a gas line to a threaded connector, the apparatus comprising, a threaded adapter disposed at a first end of the apparatus, the adapter having a first threaded end configured to threadingly engage the threaded connector and a second threaded end;

a nut configured to threadingly engage the second threaded end of the threaded adapter to form an internal cavity between the threaded adapter, the nut, and the gas line, the nut having an internally sloped shoulder forming an outer end of the internal cavity;

a flexible seal disposed in the internal cavity adjacent the threaded adapter;

a collet gripper comprising an annular base and a plurality of fingers extending longitudinally from the annular base, the collet gripper disposed in the internal cavity with the annular base abutting the flexible seal and the plurality of fingers extending away from the threaded adapter, each of the fingers of the collet gripper having a sloped face on an end opposite the threaded adapter and extending substantially parallel to and in abutting relationship with the internally sloped shoulder on the nut; and a tubular gas line support insert secured within the threaded adapter and extending through the second threaded end thereof forming an annular gap between an outer surface of the tubular gas line support insert and an inner surface of the second threaded end of the threaded adapter, the annular gap sized for insertion of an end of the gas line therein with the gas line extending around the tubular gas line support insert;

wherein threaded advancement of the nut on the second threaded end of the threaded adapter toward the first threaded end thereon advances the internally sloped shoulder of the nut longitudinally against the sloped face of each of the plurality of fingers driving the plurality of fingers radially inward against the gas line and drives the collet gripper longitudinally along the gas line and toward the flexible seal compressing the flexible seal between annular base of the collet gripper and the threaded adapter such that the flexible seal expands radially inward to frictional engage the gas line.

10. The apparatus of claim 9, further comprising:

a flexible casing conduit extending around a portion of the gas line;

a hose ferrule configured to secure a first end of the flexible conduit casing to the nut; and a moisture seal extending around the gas line, the moisture seal being configured to secure a second end of the flexible conduit casing to the gas line.

11. The apparatus of claim 9, wherein the threaded adapter includes a recess formed in the second threaded end of the threaded adapter and configured to hold a portion of the flexible seal therein.

12. The apparatus of claim 9, wherein each of the fingers of the collet gripper includes a plurality of barbs on an inner surface thereof configured to engage with the gas line when the nut is threadingly advanced on the second threaded end of the threaded adapter to drive the plurality of fingers radially inward against the gas line.

13. The apparatus of claim 12, wherein the collet gripper includes a recess disposed at a second end thereof, the recess being configured to restrain the flexible seal.

14. A gas riser apparatus for connecting a gas line to a connection, the apparatus having a first end and a second end and comprising:

a threaded adapter disposed at the first end of the apparatus, the threaded adapter having a first externally threaded end and a second externally threaded end;

a nut configured to threadingly engage the second externally threaded end of the threaded adapter to form an internal cavity between the threaded adapter, the nut, and the gas line, the nut having an internally sloped shoulder forming a portion of the internal cavity;

a flexible sealing element disposed in the internal cavity proximate the threaded adapter;

a collet gripper disposed in the internal cavity and having a base end abutting the flexible sealing element and a sloped face of a distal end of the collet gripper abutting the sloped shoulder;

a tubular gas line support insert connected to and disposed within the threaded adapter and extending through the second threaded end thereof forming an annular gap between an outer surface of the tubular gas line support insert and an inner surface of the second threaded end of the threaded adapter, the annular gap sized for insertion of an end of the gas line therein with the gas line extending around the tubular gas line support insert;

a flexible casing conduit extending around a portion of a periphery of the gas line;

a hose ferrule secured to and extending circumferentially around the nut and extending around a portion of the casing conduit; and a moisture seal disposed proximate the second end of the apparatus, the moisture seal extending around the gas line and the flexible casing conduit; wherein:

threaded advancement of the nut on the second externally threaded end of the threaded adapter toward the first externally threaded end thereon advances the internally sloped shoulder of the nut longitudinally against the sloped face of the collet gripper driving the collet gripper radially inward against the gas line and driving the collet gripper longitudinally along the gas line and toward the flexible seal compressing the flexible seal between annular base of the collet gripper and the threaded adapter such that the flexible seal expands radially inward to frictional engage the gas line.

15. The gas riser apparatus of claim 14, wherein the threaded adapter includes a notch configured to hold a portion of the flexible sealing element therein.

16. The gas riser apparatus of claim 14, wherein the threaded adapter includes a notch configured to frictionally engage the gas line support insert.

17. The gas riser apparatus of claim 14, wherein the collet gripper comprises a plurality of fingers projecting longitudinally away from the base end of the collet gripper, each finger having a plurality of barbs formed on an inner surface thereof and are configured to engage with the gas line when the nut is threadingly advanced on the second threaded end of the threaded adapter towards the first end thereof compressing the fingers radially inward.

18. The gas riser apparatus of claim 17, wherein the collet gripper includes a recess disposed at a second end thereof, the recess being configured to restrain the flexible sealing element therein.

19. The gas riser apparatus of claim 14, wherein the collet gripper is formed from polyoxymethylene.

* * * * *